United States Patent [19]
Carusone, Jr. et al.

[11] Patent Number: 5,299,201
[45] Date of Patent: Mar. 29, 1994

[54] METHOD AND APPARATUS FOR ISOLATING FAULTS IN A NETWORK HAVING SERIALLY CONNECTED LINKS

[75] Inventors: Anthony Carusone, Jr., Tucson, Ariz.; Albert W. Garrigan, Wappingers Falls; Wayne Hunsinger, Endwell, both of N.Y.; Gerald T. Moffitt, San Jose, Calif.; Jordan M. Taylor, Poughkeepsie; Nandakamar N. Tendolkar, Wappingers Falls, both of N.Y.

[73] Assignee: International Business Machines Corporation, Armonk, N.Y.

[21] Appl. No.: 112,173

[22] Filed: Aug. 26, 1993

Related U.S. Application Data

[63] Continuation of Ser. No. 577,403, Sep. 4, 1990, abandoned.

[51] Int. Cl.$^5$ .............................................. G06F 11/00
[52] U.S. Cl. ...................................... 371/51; 371/20.1
[58] Field of Search ...................... 371/5.1, 11.2, 20.1

[56] References Cited

U.S. PATENT DOCUMENTS

| | | | |
|---|---|---|---|
| 3,882,456 | 5/1975 | Takada | 340/146.1 R |
| 4,380,067 | 4/1983 | Beardsley et al. | 371/11 |
| 4,490,817 | 12/1984 | Turner | 370/17 |
| 4,604,745 | 8/1986 | Takasaki et al. | 371/22 |
| 4,710,924 | 12/1987 | Chum | 71/4 |
| 4,713,810 | 12/1987 | Chum | 371/4 |
| 4,730,313 | 3/1988 | Stephenson et al. | 371/5 |
| 4,769,761 | 9/1988 | Downes et al. | 364/514 |
| 4,817,092 | 3/1989 | Denny | 371/11 |
| 4,881,230 | 11/1989 | Clark et al. | 271/20.1 |
| 4,891,812 | 1/1990 | Bocci et al. | 371/5.5 |
| 4,941,161 | 7/1990 | Cook | 377/28 |

FOREIGN PATENT DOCUMENTS 0118763 9/1984 European Pat. Off.
3900808 7/1990 Fed. Rep. of Germany.

Primary Examiner—Robert W. Beausoliel, Jr.
Assistant Examiner—Glenn Snyder
Attorney, Agent, or Firm—Lynn L. Augspurger

[57] ABSTRACT

A fault isolation system for use in a network in which bit errors resulting in detected code violation errors or disparity errors may be propagated from a first link to a second link of a network in which multiple serially coupled links may couple two devices. Errors in excess of a first threshold are detected at the receiving end of the first link, while errors in excess of a second threshold greater than the first threshold are detected at the receiving end of the second link. Errors are attributed to the first link in response to the detection of errors in excess of the thresholds on both links and are attributed to the link for which the threshold was exceeded in response to the detection of errors in excess of the threshold on only one of the links. If a substantial number of the bit errors resulting in the threshold being exceeded on the second link originated on the first link, the first threshold will also be exceeded with a high degree of probability. This prevents the erroneous identification of the second link as being the source of the fault where the fault actually originated from a condition on the first link.

20 Claims, 4 Drawing Sheets

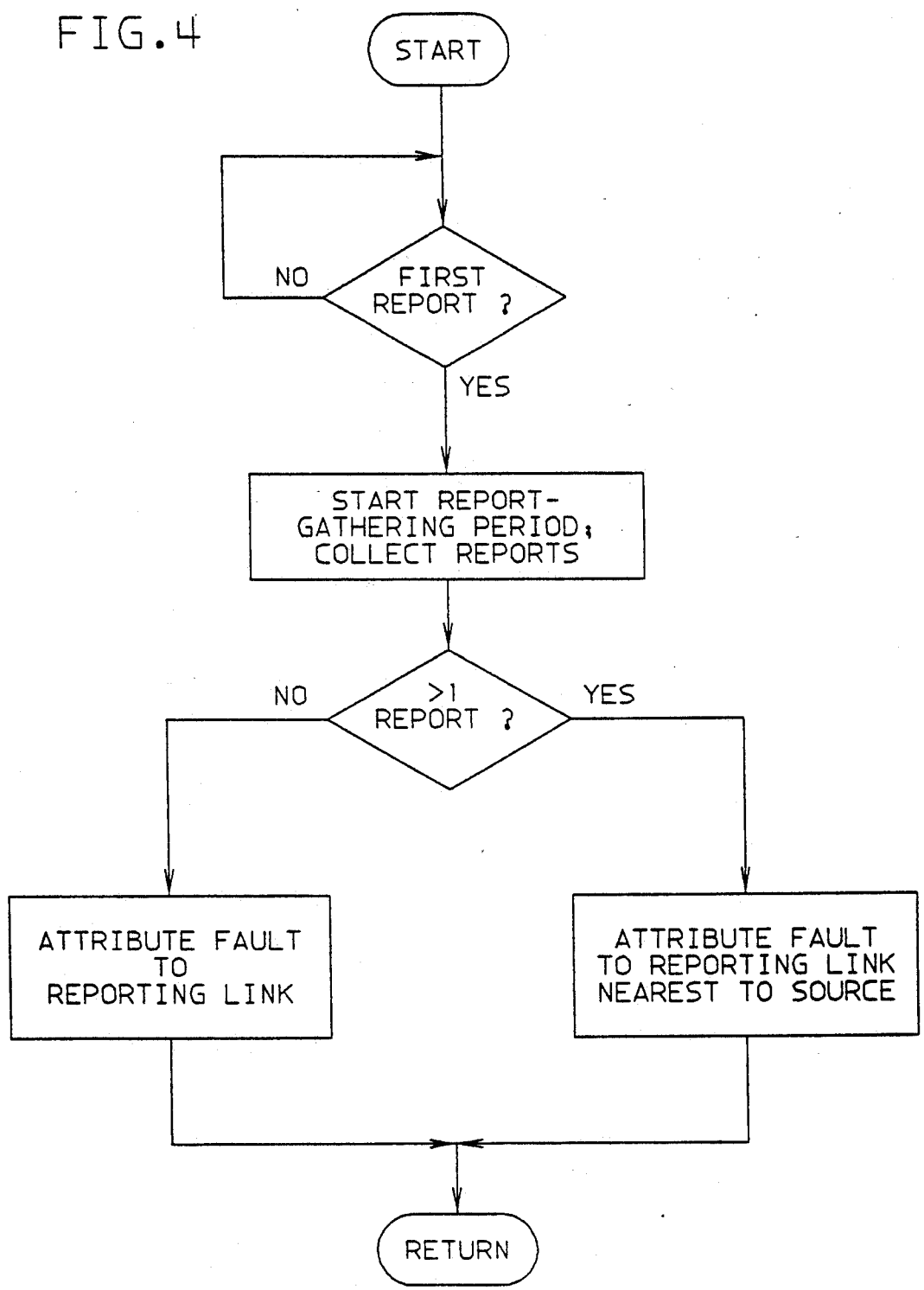

METHOD AND APPARATUS FOR ISOLATING FAULTS IN A NETWORK HAVING SERIALLY CONNECTED LINKS

CROSS-REFERENCE TO RELATED APPLICATION

This application is a continuation of application Ser. No. 07/577,403, filed Sept. 4, 1990, now abandoned.

BACKGROUND OF THE INVENTION

1. Field of the Invention

This invention relates to a system for isolating faults in a network and, in particular, to a method and apparatus for isolating faults in a network having serially connected links.

2. Description of the Related Art

Input/output (I/O) systems for interconnecting processors and control units via serial fiber optic links have been previously described in U.S. Pat. No. 5,107,489 issued Apr. 21, 1992 for SWITCH AND ITS PROTOCOL FOR MAKING DYNAMIC CONNECTIONS, the copending application, of C. J. Bailey et al., Ser. No. 07/444,190, filed Nov. 28, 1989, and U.S. Pat. No. 5,157,667 issued Oct. 20, 1992 to Carusone et al. for METHODS AND APPARATUS FOR PERFORMING FAULT ISOLATION AND FAILURE ANALYSIS IN LINK-CONNECTED SYSTEMS, all of which are assigned to the owner of this application. In the system described in these applications, one or more crosspoint switches having serial fiber optic ports may be actuated to form either a static or a dynamic connection between pairs of ports to establish bidirectional communication between a processor and a control unit coupled to one or more peripheral devices such as a printer, a direct access storage device (DASD) (e.g., a magnetic or optical disk drive), or a magnetic tape drive.

In a typical installation, a first link may interconnect a processor and a switch, while a second link may interconnect the switch and a control unit to complete the connection between the processor and the control unit. Each link may be several kilometers in length.

In a system of the type described above, one failure mode of the transmitter at one end of a fiber optic link is a gradually decreasing amount of signal emitted prior to the sudden complete loss of transmission. The processor-to-control unit interfaces of the system are designed to be tolerant of bit errors. As the rate of errors increases, the performance decreases. Beyond a certain point, the error rate will cause a noticeable degradation. The bit error rate (BER) thresholding process is designed to catch these situations before there is a complete loss of transmission or an unacceptable performance degradation. The bit error rate increases as the signal decreases. Therefore when the specified BER threshold is reached, notification is made that service is required. The system can continue in degraded operation, but since the threshold point is chosen at a point where there is only a small effect on system performance, maintenance can be deferred until a more convenient time.

Depending on the mode of operation of the switch (i.e., as a dynamic switch or a static switch), some or all of the bit errors occurring on the originating link may be propagated through the switch to the destination link. Static switches propagate all bit errors from one link to the other, while dynamic switches only propagate a portion of the errors.

Some bit errors may occur randomly, not as a result of component deterioration, at a rate that does not appreciably degrade system performance. Other errors, however, do indicate a fault in the sense of component deterioration. Errors of the first type are handled by various error detecting and correcting schemes which are well known generally and are beyond the scope of this disclosure. Errors of the second type, which are occasioned by component deterioration and which appreciably degrade system performance (although perhaps not to the extent of rendering the system inoperable), must be addressed by servicing the deteriorating component.

It is highly desirable, in a system such as the one described above having serially connected links, to be able to isolate the link on which a fault originates. The difficulty of such an apparently simple objective becomes apparent, however, when one considers how one might detect faults in a particular link. As noted above, one method that might be employed is to define a threshold error rate and to declare a fault if errors are detected at a rate exceeding the threshold. In a system having serially connected links over which errors may be propagated, this method is insufficient in itself since error reports may be generated from several such links simultaneously.

Furthermore, errors may be occurring on the source link at a rate just below the threshold, as a result of component deterioration. Since these errors are propagated to the destination link, they will be detected on that link also and, from the standpoint of the destination unit, are indistinguishable from errors arising on the destination link.

Under these conditions, a single error on the destination link, or a small number of randomly occurring errors on that link not due to component deterioration, will move the cumulative error rate detected on the destination link over the threshold. As a result, the threshold crossing will be mistakenly attributed to a fault on the destination link, even if, as in the above hypothetical, the fault is actually on the source link. What is desired, therefore, is a system of fault isolation that correctly attributes errors in such situations to a fault on the source link.

SUMMARY OF THE INVENTION

In general, the present invention contemplates a method and apparatus for isolating faults in a system in which an originating unit transmits data to a destination unit via an intermediate unit, the originating unit being coupled to the intermediate unit by a first link and the intermediate unit being coupled to the destination unit by a second link, the intermediate unit propagating at least some errors arising on the first link to the second link. In accordance with the invention, errors in excess of a first threshold are detected on the first link, while errors in excess of a second threshold preferably greater than the first threshold are detected on the second link.

Errors are attributed to faults on one or both links on the basis of the detection of the errors in excess of the respective thresholds. More particularly, errors are attributed to the first link in response to the detection of errors in excess of the thresholds on both links, since multiple error reports from contiguous links on a single communication path are in all likelihood due to the propagation of errors from a single faulty link. Errors are attributed to the link for which the threshold was exceeded in response to the detection of errors in excess of the threshold on only one of the links.

The respective error thresholds are preferably set at such levels that, if the errors originating on the first link are below the first threshold, the additional errors occurring on a normally functioning second link will be unlikely to push the cumulative error rate (errors on the second link plus propagated errors from the first link) over the second threshold. This avoids the undesirable result of errors due to a fault on the first link causing an erroneous attribution of the fault to the second link.

BRIEF DESCRIPTION OF THE DRAWINGS

FIG. 4 is a flowchart illustrating the operation of the fault analyzer shown in FIG. 2.

DESCRIPTION OF THE PREFERRED EMBODIMENT

Figure 1:
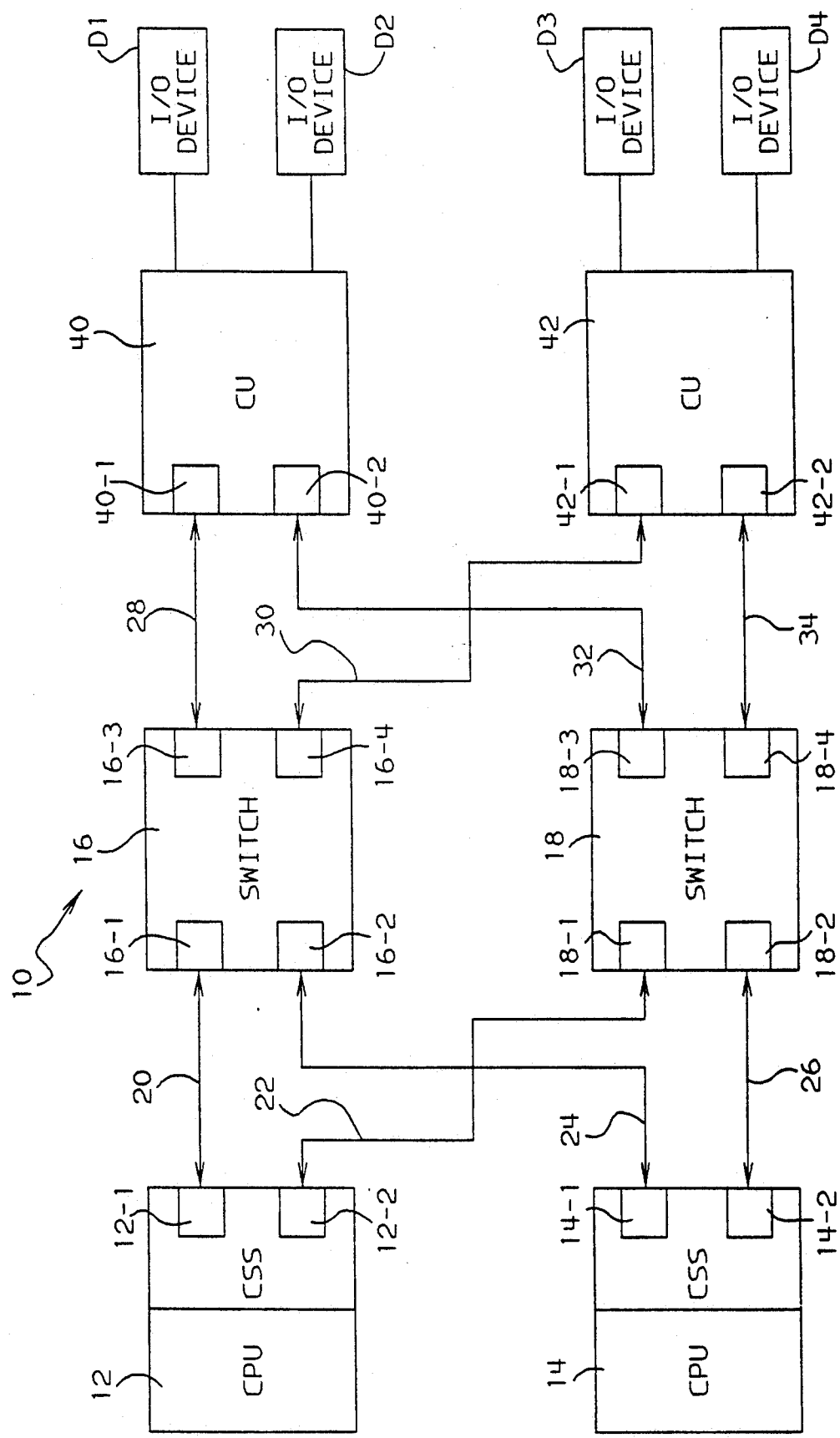
FIG. 1 is a schematic diagram of a system of serially interconnected units in which the present invention may be used.

Referring now to FIG. 1, a system 10 in which the present invention may be used may include host processors or central processing units (CPUs) 12 and 14 coupled to dynamic crosspoint switches 16 and 18 by serial fiber optic links 20, 22, 24 and 26. Although not shown in FIG. 1 and not part of the present invention, each processor 12 or 14 may contain multiple central processing units as part of a central processing complex (CPC). Although a pair of processors 12 and 14 and a pair of switches 16 and 18 are shown in FIG. 1, the particular number of units of each type is arbitrary as far as the essentials of this invention are concerned. Processor 12 has a pair of link adapters 12-1 and 12-2 coupled to respective links 20 and 22, while similarly processor 14 has a pair of link adapters 14-1 and 14-2 to respective links 24 and 26. Link adapters 12-1, 12-2, 14-1 and 14-2 correspond to respective I/0 channels, or channel paths, of processors 12 and 14 that are identified by channel path identifiers (CHPIDs). Together the channels of a particular processor make up its channel subsystem (CSS).

Link 20 couples link adapter 12-1 of processor 12 to a link adapter 16-1 of switch 16; link 22 couples link adapter 12-2 of processor 12 to a link adapter 18-1 of switch 18; link 24 couples link adapter 14-1 of processor 14 to a link adapter 16-2 of switch 16; and link 26 couples link adapter 14-2 of processor 14 to a link adapter 18-2 of switch 18. Switch link adapters 16-1, 16-2, 18-1, and 18-2 (as well as other switch link adapters to be described) correspond to respective ports or interfaces of switches 16 and 18, just as the link adapters of processors 12 and 14 correspond to respective channels (CHPIDs) of the processor channel subsystems. Each of links 20 to 26 is a duplex link containing a pair of fiber optic conductors for simultaneous bidirectional communication between the respective unit interfaces (channel and switch port) at the ends of the link.

Switches 16 and 18 are in turn coupled to control units 40 and 42 associated with peripheral devices D1 to D4, such as the storage devices referred to above, by duplex serial fiber optic links 28, 30, 32 and 34. Thus, link 28 couples a link adapter 16-3 of switch 16 to a link adapter 40-1 of control unit 40; link 30 couples a link adapter 16-4 of switch 16 to a link adapter 42-1 of control unit 42; link 32 couples a link adapter 18-3 of switch 18 to a link adapter 40-2 of control unit 40; and link 34 couples a link adapter 18-4 of switch 18 to a link adapter 42-2 of control unit 42. Link adapters 40-1, 40-2, 42-1 and 42-2 correspond to respective interfaces of control units 40 and 42, in a manner similar to that of the link adapters of processors 12 and 14 and switches 16 and 18.

Although each of switches 16 and 18 is shown as having only four ports, they may typically have many more for attachment to other units. In general, each of switches 16 and 18 has 2n ports and is actuable up to n duplex connections between respective pairs of ports. Thus, where n is 32, switch 16 or 18 may be actuated to make up to 32 connections between respective pairs of ports, for a total of 64 pairwise connected ports.

Switches 16 and 18 are capable of two basic types of connections: static and dynamic. Static connections are established between pairs of switch ports without regard to a particular message that may be passing between the ports; the ports remain connected, even though the connecting links may be inactive. A dynamic connection, on the other hand, is made for a particular communication between ports, and is broken when the communication is terminated. In a given switch, certain port pairs may be connected statically, while other port pairs may be coupled dynamically. For convenience herein, a switch may be described as being "dynamic" or "static", although it is the connection between the port pairs that is actually being referred to. In the system 10 there may be a maximum of one switch connection of each type (static or dynamic) between a processor and a control unit. There may, therefore, be up to three links plus two switch connectors (one of each type) between a processor and a control unit. Although the particular protocol for making dynamic connections between switch ports does not as such form part of this invention, a preferred protocol is described in the copending application of P. J. Brown et al. referred to above, the specification of which is incorporated herein by reference.

A further description of the system 10 may be found in the above-identified copending applications of C. J. Bailey et al. and A. Carusone et al., the specifications of which are incorporated herein by reference.

Figure 2:
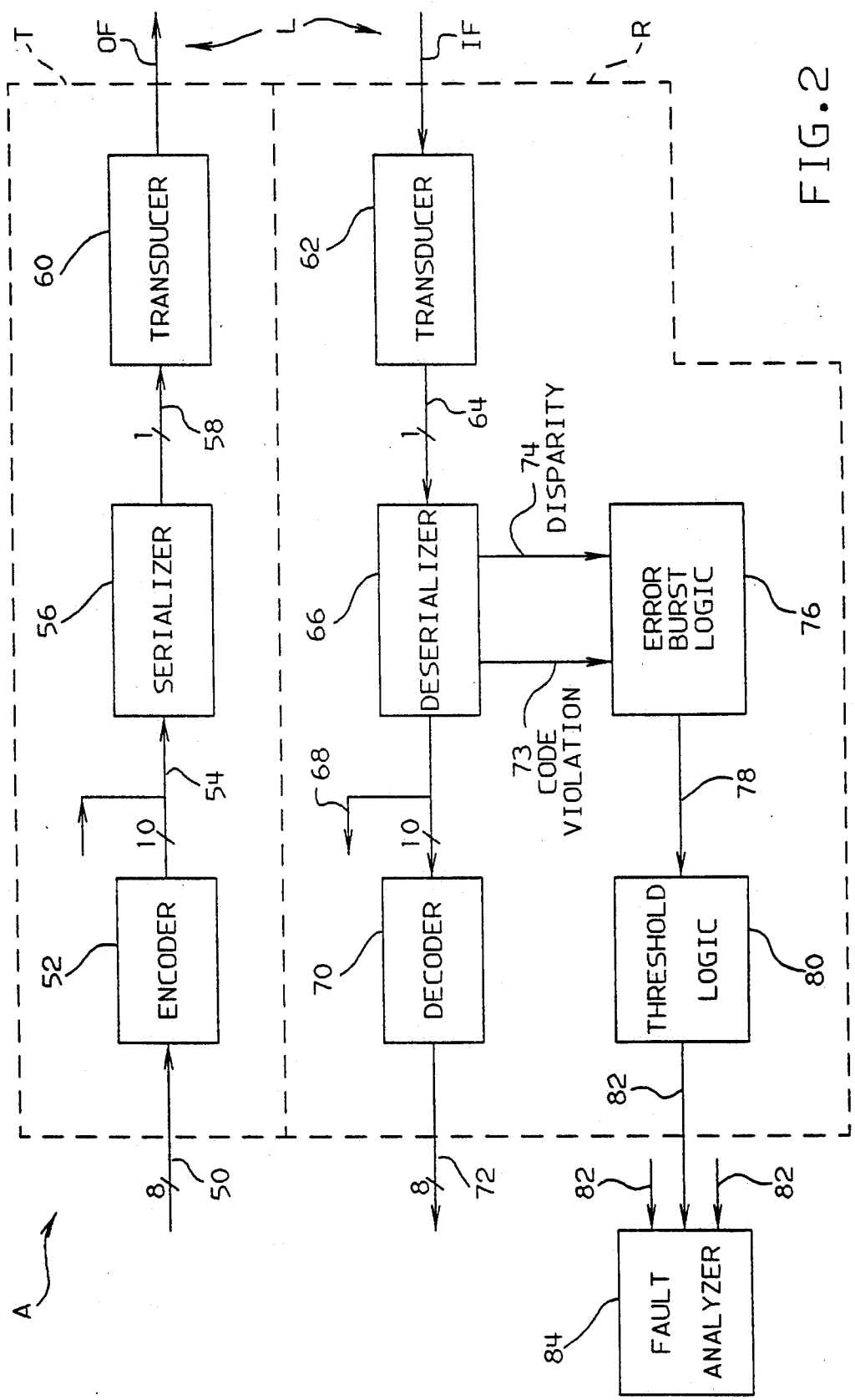
FIG. 2 is a schematic diagram of a link adapter on one of the processors shown in FIG. 1.

A typical link adapter A is shown in more detail in FIG. 2. As shown in that figure, in the transmitter section T of the link adapter A system data originating from the host unit (processor, switch or control unit) on a parallel 8-bit line 50 is fed to an encoder 52, which converts the 8-bit system data to a 10-bit parallel encoded form appearing on line 54. The particular encoding scheme used is described in Franaszek et al. U.S. Pat. No. 4,486,739, the specification of which is incorporated herein by reference. A serializer 56 converts the encoded data to a serial stream of bits which are provided on line 58. An electrical-to-optical transducer 60 such as a laser or light-emitting diode (LED) converts the electrical signal on line 58 to an optical signal which is sent along the outgoing fiber OF of link L from link adapter A.

In the receiver section R of link adapter A, an optical-to-electrical transducer 62 such as a photodiode converts the optical signal from incoming fiber IF of link L back to an electrical signal appearing on line 64. A deserializer 66 responsive to line 64 converts the serial signal to a 10-bit parallel signal on line 68. A decoder 70 converts the 10-bit parallel signal back to the 8-bit form used for system data, which is sent to the host unit on line 72.

Communication on one of optical links 20 to 34 is accomplished by the transmitter T at one end of the link serializing 10-bit characters into a single bit data stream which is then sent out over the outgoing optical fiber OF. The receiver R at the other end deserializes its input data stream back into 10-bit characters. The receiver R is out of synchronization with the transmitter T when it divides the input data stream into 10-bit characters at points different from the transmitter's assembly of 10-bit characters. Suitable means for ensuring character synchronization are described in U.S. Pat. No. 4,975,916 issued Dec. 4, 1990 to Miracle et al. for CHARACTER SYNCHRONIZATION, the specification of which is incorporated herein by reference.

Deserializer 66 of receiver R generates a first error signal on line 73 in response to the detection of a code-violation error, to be defined below, as well as a second error signal on line 74 in response to the detection of a running-disparity error, also to be defined below. Error burst logic 76, to be defined further below, responds to the the error signals on lines 73 and 74 to generate an error burst signal on line 78. Threshold logic 80 responsive to the error burst line 78 generates a fault signal on line 82 in response to the counting of a predetermined number of error bursts within a predetermined threshold period.

As is described further below, error threshold logic 80 may operate in either of two modes, depending on the identity of the host unit. If the host unit is a processor 12 or 14 or control unit 40 or 42, then the threshold logic is simply reset to zero at the end of successive fixed (i.e., non-moving) threshold periods of equal duration.

On the other hand, if the host unit is a switch, threshold logic 80 uses a moving threshold period which has a predetermined duration and ends with the present instant of time. Thus, each error burst causes the error count to be incremented at the time of the error burst and to be decremented upon the lapse of the predetermined threshold period, since the error burst in question is no longer within the threshold period. This different counting mode is used to ensure that the switch receiver R, which is on the source link of a pair of source and destination links, has counted for a full threshold period if a fault signal is generated on the destination link. Suitable means, either hardware or microcode, for implementing such a moving threshold period and for incrementing and decrementing the count will be apparent to those skilled in the art, and are therefore not described herein.

A fault analyzer 84 responsive to the fault signal 82 originating from the link adapter A shown in FIG. 2, as well as from the other link adapters in the system, responds to the fault signals to generate a suitable fault message advising the operator of the existence and probable location of the fault. Fault analyzer 84 may be implemented in any suitable manner and is situated at any suitable location in the system, such as in a service processor (not shown) attached to one or both of processors 12 and 14 as shown in the copending application of Carusone et al. identified above. Fault signals may be routed from the originating receivers R to the fault analyzer 84 in any suitable manner, such as over the fiber optic links as described in the same copending application. The details of routing the fault signals to the fault analyzer 84 do not as such form part of the invention and hence are not described herein. Fault analyzer 84 contains suitable means for determining that incoming fault reports originate from serially connected links along a particular connection path. This determination is made from configuration data, either from a previously generated table or from data accompanying each individual fault report that identifies both the reporting link adapter and the "neighbor" adapter at the other end of the link, as described in the copending application of A. Carusone et al.

As shown in FIG. 4, fault analyzer 84, upon receiving a first fault report, starts a report-gathering period and collects other reports, if any, received in that period. At the end of the period, the analyzer 84 analyzes the reports received to attribute the fault to a link. If only a single bit error rate threshold occurs, it is obvious that the errors contributing to that threshold occurred on the link where the threshold was detected. If bit error rate thresholds occur on multiple connected links, the reports of those thresholds, collected by analyzer 84, are analyzed to determine on which link the bit errors originated. If the thresholds were detected at receivers R that were receiving signals originating from a processor 12 or 14, the link detecting a threshold which is closest to the processor would be declared responsible for the bit errors. If the thresholds were detected at receivers that were receiving signals originating from a control unit 40 or 42, the link detecting a threshold which is closest to the control unit would be declared responsible for the bit errors.

The link adapters of switches 16 and 18 are similar in construction to link adapter A, described above. However, although the incoming characters are deserialized and decoded into 8-bit bytes by the switch adapters to determine the existence of any special messages (such as requests for connection or disconnection) intended for the switch itself, the characters are directed through the switch matrix in their original 10-bit encoded form. The characters remain in that form until they reach the destination unit (processor or control unit) for which they are intended, at which time they are converted back to the 8-bit form of system data.

As noted above, system data consists of 8-bit bytes which, for transmission over the fiber optic links 20 to 34 are encoded into 10-bit characters. The characteristics of the transmitters T and receivers R (FIG. 2) used require that the bit stream consist of nearly the same numbers of 1s and 0s. The "disparity" of a character is the difference between the numbers of ones and zeros in the character. Positive and negative disparity numbers refer to an excess of ones and zeros, respectively. Each input byte to encoder 52 can be encoded into either a single character having a disparity of 0 (the same number of ones and zeros), or into one of two characters, the first having a disparity of +2 (two more ones than zeros), the other having a disparity of −2 (two more zeros than ones). The "running disparity" is calculated by adding up the disparity of every character. The allowed running disparity at the end of any character is allowed to be only +2, −2 or 0. Therefore, during encoding, when the bit stream has a running disparity of +2 at the end of a character, the next character is chosen that has a disparity of 0 or −2. And when the bit stream has a running disparity of −2 at the end of a character, the next character is chosen that has a disparity of 0 or +2. When the bit stream has a running disparity of 0 at the end of a character, the next character is chosen that has a disparity of 0 or a polarity opposite to the polarity of the last nonzero-disparity character. On receipt of characters, the running disparity is calculated. If, at the end of a character, the running disparity is other than $+2$, $-2$ or 0, it is known that an error has occurred in the bit stream and a disparity error is detected.

There are 1024 possible bit combinations in a 10-bit character. There are 256 possible bit combinations in an 8-bit system data byte. One zero-disparity character or two nonzero-disparity characters are assigned for each of the 256 byte combinations, and a few control characters are similarly assigned one or two characters out of those remaining. This leaves about five hundred unassigned, illegal character combinations. If one of these illegal characters is encountered, a code-violation error is detected.

In the system 10, bit errors are not detected directly. They usually cause one or more of the following types of errors:

1. Code-Violation or Disparity Errors.
   (10-bit characters other than those allowed or excess ones or zeros).
2. Sequencing Errors. (characters coming in an order other than that permitted).
3. Cyclic Redundancy Check (CRC) Errors.
   (Each frame of data transmitted over the links 20 to 34 has cyclic redundancy characters added to the end to determine if any of the characters in the frame have been altered in transmission. The received frame is examined to determine if any alteration has taken place. If this particular examination shows that alteration has taken place, a CRC error is declared to exist.)

Bit errors cause the above errors singly or in combination. Some bit errors cause a legal character to be changed to an illegal character, thus producing a code-violation error directly. There are times when the changed character also causes a disparity error to occur on a following character. In addition, some bit errors may change a legal character into another legal character. In some of these cases a disparity error does not occur on a following character. Cyclic redundancy checking is performed to protect against bit errors during frame transmission which are not detected as code-violation or disparity errors. Some bit errors that change one legal character into another legal character also result in a sequencing error. In some of these cases, a disparity error also follows or a CRC error occurs, depending on the location of the bit error.

Since the major type of errors expected are single bit errors, code-violation and disparity errors should predominate. Counting only code-violation and disparity errors will be a close approximation of the totality of errors. Therefore, only code-violation and disparity errors are used for BER thresholding in the system of the present invention.

A single error could result in several related errors occurring closely together, which could result in multiple counts. A single error might occur at the end of one character that caused a code-violation error in it and also the following character. In addition, a disparity error might occur on a following character, caused by the same single error. To prevent multiple error counts from a single cause, the following concept of an error burst is introduced:

1. An error burst is a time period (e.g., 1 to 2 seconds) long during which one or more code-violation or disparity errors occur.
2. Only one error in an error burst is counted toward the bit error threshold.

Figure 3:
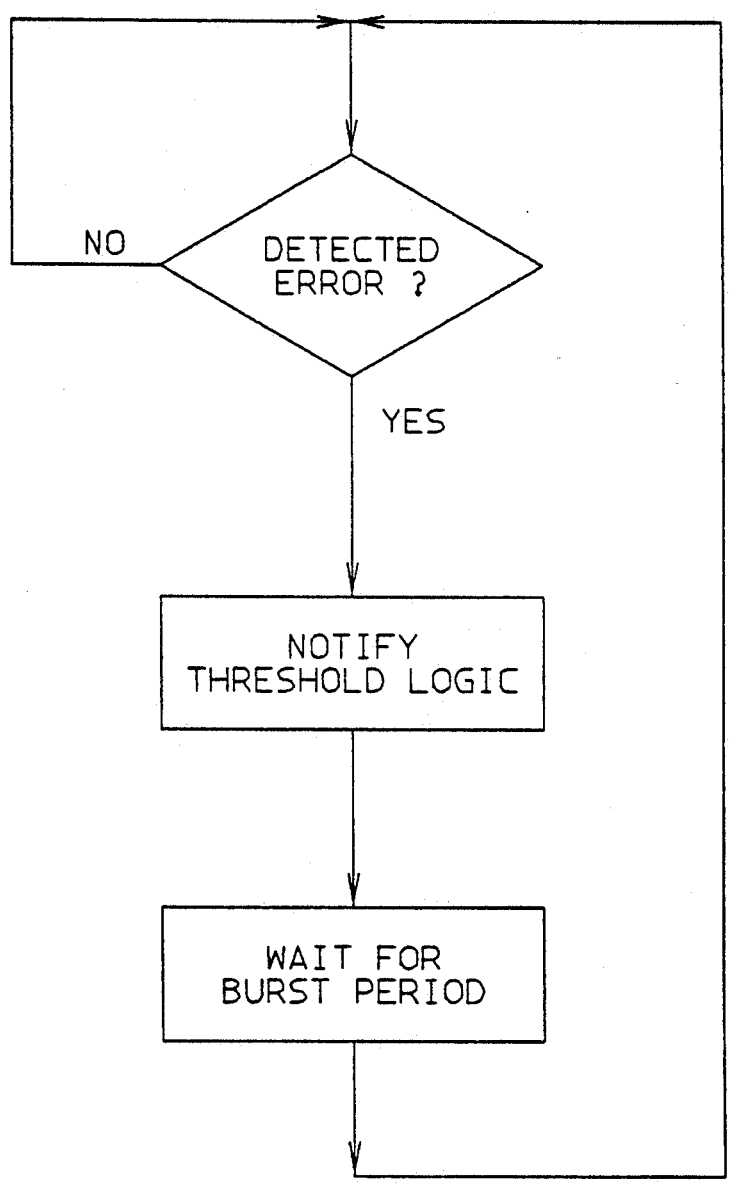
FIG. 3 is a flowchart illustrating the operation of the error burst logic of the system shown in FIG. 2.

FIG. 3 illustrates this concept further. Upon receiving an error detection signal from deserializer 66 on line 73 or 74, error burst logic 76 (FIG. 2) notifies threshold logic 80 with a suitable signal on line 78 and waits a predetermined error burst interval, typically much shorter than the threshold period (e.g., 1 to 2 seconds), before again responding to the detection of other errors by deserializer 66. The error burst routine shown in FIG. 3 may be realized by any suitable means, such as hardware or microcode.

The BER is measured continually, except for times when loss of synchronization occurs, when a link failure occurs or when the link is off line. When the BER is measured continually, the number of bits passing can be counted by timing since a known number of bits pass during a specific time period. The BER threshold measurement is accomplished by counting the number of error bursts that occur in a predetermined (e.g., 5 minute) period. When the count equals a specific number, the threshold is said to be exceeded. This specific number is called the threshold error count. The fiber optic system 10 may typically have a data rate of 200 megabits per second. During a 5-minute period, $6 \times 10^{10}$ bits would occur. An exact 5-minute period is preferably used for human factors considerations.

In the system 10, a bit error rate of $10^{-10}$ even on all connections would have only a small effect on the performance of the system. Typically only an insignificant number of nonfailing fiber optic connections would exceed a bit error rate of $10^{-15}$ during the expected lifetime of the system. Accordingly, a suitable initial error threshold may be $10^{-10}$. The count threshold is set so that, when it is exceeded, there is at least a 95% probability that the error threshold has been exceeded. ("Error threshold" as used here refers to the long-term average error rate of the link in question, as distinguished from the count obtained for a particular 5-minute period.) With random errors, a count of three times the specified error threshold must occur over a 5-minute period for a 95% probability to exist that the long-term average rate exceeds the specified threshold.

The occurrence of 18 errors in 5 minutes implies an error rate of approximately $3 \times 10^{-10}$ if the results for the period are typical for the underlying process (approximately because the 1- to 2-second error bursts during which errors are not counted must be subtracted from the 5-minute period). Conversely, since during a 5-minute period $6 \times 10^{10}$ bits occur, an error rate of $3 \times 10^{-10}$ would imply an occurrence on the average of 18 errors in a 5-minute period. In the disclosed system, count thresholds of less than 18 are chosen for ease of implementation, resulting in an error threshold (at 95% probability) of slightly less than $10^{-10}$. However that is still within the tolerance of the thresholding process.

In the system 10, when two links are coupled through a switch connection, some of the bit errors (in the case of a dynamic connection) or all of the bit errors (in the case of a static connection) received by the switch from the first link are passed to the second link. Accordingly, whereas the receivers R of processors 12 and 14 and control units 40 and 42, have their count thresholds set at 15 error bursts per 5-minute period, the receivers of switches 16 and 18 have their count thresholds set at 12 error bursts in any arbitrary 5-minute period. The count threshold for switch receivers is set differently from those for channel and control unit receivers to ensure that count thresholds are not exceeded only on nonfailing destination links because of error propagation from the source links.

This reasoning will be explained further with reference to the following example, in which it is assumed that a message originating from link adapter 12-1 of processor 12 is sent to link adapter 40-1 of control unit 40 via links 20 and 28 through link adapters 16-1 and 16-3 of switch 16. It will be assumed further that the connection between the switch ports is a static connection that remains after the links become inactive.

If the count threshold were set at 15 at both the switch end of link 20 (at adapter 16-1) and the control unit end of link 28 (at adapter 40-1), it would be possible for the switch 16 to receive (and pass through) 14 errors from link 20 during a 5-minute period without exceeding the count threshold for that link. Yet a single random error on link 28 during that period would cause the count threshold to be exceeded on link 28. As a result, a fault would be wrongly attributed to link 28, even though it arose on link 20. Although it is permissible for the count threshold to be exceeded on both of links 20 and 28 because of error propagation, the count threshold should not be exceeded only on the link 28 with the single error.

With the count thresholds on links 20 and 28 (for the direction of communication assumed) set at 12 and 15, respectively, link 28 and its associated adapters 16-3 and 40-1 would have to generate at least 4 errors to exceed the count threshold on that link without also exceeding the count threshold on link 20. If a link is operating at a bit error rate (BER) as high as $10^{-12}$, the average number of errors on that link over a 5-minute period is 0.06. It would be very improbable that a link operating at that level or lower would generate 4 errors in a 5-minute period. Therefore, a count of 4 on link 28 indicates that the link is considerably exceeding the error rate of $10^{-12}$, even though it has not reached the error threshold of $10^{-10}$ postulated above. It would be rare for such a combination of events to occur, but when it does it is appropriate to repair the link 28 that is generating the 4 errors.

The count threshold of 12 for the adapter 16-1 of switch 16 also signals a point when the link 20 (continuing the above example) should be serviced as well. There is greater than a 95% probability that a $7 \times 10^{-11}$ error rate is occurring when the count threshold of 12 is reached. (The probability of a $10^{-10}$ error rate is somewhat less than that). An error rate of $7 \times 10^{-11}$ is 70,000 times the 3-sigma end-of-life error rate; therefore the link should be serviced.

A switch receiver R must detect that a threshold count has been exceeded in any arbitrary 5-minute period, hence the moving threshold period described above. The error-counting process is reset and restarted when exiting an offline condition or when a link failure is no longer recognized. The link goes through an offline condition whenever a unit is powered on and at similar times when it is reinitialized, so the error-counting process is reset and restarted at those times also.

In a similar manner, the adapters associated with processors 12 and 14 and control units 40 and 42 reset and restart the error-counting process when exiting an offline condition (including power-on and reinitialization) or when a link failure is no longer recognized. In addition, and as described above, processors 12 and 14 and control units 40 and 42 restart the error-counting process whenever their 5-minute timer times out, even though the count threshold has not been exceeded.

As has been noted several times above, a processor channel or control unit is allowed to reset and restart its bit-error counting process at the end of each 5-minute counting period, while a switch is not. The different criteria for the resetting and restarting of the bit error rate thresholding process ensure that a bit error rate threshold is detected on the link where the errors are actually exceeding the threshold when errors are propagated by the switch. The difference in the criteria ensures that during any 5-minute period that the switch propagates enough errors for the link with the lower error rate to detect a bit error rate threshold, the switch will also detect a bit error rate threshold. In order for this to occur the switch must be able to detect a threshold if it occurs in any arbitrary 5-minute period.

Since a switch when used to make a dynamic connection does not propagate all of the bit errors from one side to the other, it is extremely improbable that it would not detect a threshold of 12 errors on one link while propagating enough errors for a threshold of 15 to be detected on a link on the other side of the switch. The restriction that it detect a threshold of 12 during any arbitrary 5-minute period ensures that the dynamic switch detects a threshold any time it propagates enough errors to be detected on the link on the other side of the switch.

Processor channels and control units have looser constraints. If the link has a error rate exceeding $10^{-10}$ it will eventually be detected. Since the system is still operating with only minor degradation, there is no time urgency.

It may be desirable in some systems to change the threshold point. This can be readily accomplished in the disclosed system by changing the threshold period. Thus, the time period can be changed from 5 minutes to 500 minutes, thereby changing the error threshold (with 95% probability) from $10^{-10}$ to $10^{-12}$, or any point in between.

The concepts discussed here are readily applicable to systems in which a source unit is coupled to a destination unit by more than two serially connected links. In the general case, the two end units may be coupled to each other along a path comprising n intermediate units and n+1 links between adjacent units. If fault reports are received from a plurality of contiguous links, the fault is attributed to the reporting link that is nearest the source unit, since in all likelihood the multiple errors are due to the propagation of errors from a single faulty link. If a single fault report is received, then the fault is obviously attributable to the single reporting link. If fault reports are received from noncontiguous links or groups of links along a path, each noncontiguous link or group of links is analyzed separately, since the possibility of propagation has been effectively ruled out. As in the case of the two-link example, a lower threshold count is used on the source side of a static switch (or any other unit that generally propagates bit errors) than on the destination side to ensure that a single fault report does not originate from a normally functioning unit because of error propagation.

What is claimed is:

1. In a system having a plurality of processing units and at least one control unit and at least one intermediate unit for coupling the other units via fiber optic links between each of the units, and wherein each of said units has a fiber optic link adapter interface which may be actuated to form either a static or dynamic connection between the link adapter interfaces at the ends of each link units for establishing bidirectional communication between the units over the links, and wherein a processor or a control unit can function either as an originating unit or a destination unit in bidirectional communication between units, and in which an originating unit transmits data to a destination unit via an intermediate unit, said originating unit being coupled to said intermediate unit via a first link, said intermediate unit being coupled to said destination unit via a second link, said intermediate unit propagating at least some errors originating on said first link to said second link, with either said first link or said second link possibly having a fault and where faults generate error fault signals which may originate from several link adapters of the system from the plural links of the system simultaneously, and where errors occurring on a source link rating below a threshold are propagated to the destination link such that from the standpoint of the destination unit they are indistinguishable from errors arising on the destination link, and wherein said system has a fault analyzer for receiving a fault signal originating from said link adapters for isolating a link on which a fault originates, said fault analyzer providing a correct attribution of errors to a failing link when errors may occur either on a source link or a destination link without mistaking detected threshold crossings caused by cumulative errors occurring over a link, by a method of isolating errors originating on said links including the steps of:

(a) detecting the occurrence of errors on said first link in excess of a first threshold;

(b) detecting the occurrence of errors on said second link in excess of a second threshold greater than said first threshold; and (c) attributing said errors to said links on the basis of the detection of said errors in excess of said thresholds, by (1) attributing errors to said first link when errors have been detected in both of said links in excess of the thresholds on both of said links, and (2) attributing errors to the link having an error detected when errors have been detected in only one of said links in excess of the threshold for the link.

2. A method as in claim 1 in which said errors are attributed by said fault analyzer to said first link in response to the detection of errors originating from the adapter interface for said first link in excess of the thresholds on both of said links.

3. A method as in claim 1 in which said errors are attributed by said fault analyzer to the link for which the threshold was exceeded in response to the detection of errors originating from the adapter interface for said first link in excess of the threshold on only one of said links.

4. A method as in claim 1 in which said transmitted data consists of a stream of characters from which certain characters are disallowed, each of said detecting steps including the step of detecting the occurrence of a disallowed character on the corresponding link.

5. A method as in claim 1 in which said transmitted data consists of a stream of characters having respective disparities associated therewith, each of said detecting steps including the step of determining the cumulative disparity of the characters transmitted on the corresponding link.

6. A method as in claim 1 in which each of said detecting steps includes the step of counting the number of errors occurring within a predetermined period.

7. A method as in claim 6 in which each of said detecting steps includes the step of counting the number of intervals of predetermined duration shorter than the corresponding period within which one or more errors occur.

8. A method as in claim 1 in which said first step includes the step of maintaining a running count of the number of errors occurring on said first link within a predetermined period of the present.

9. A method as in claim 1 in which each of said links has a source end nearer to said source unit and a destination end nearer to said destination unit, said errors being detected at the destination ends of said links.

10. A method as in claim 1 in which said system contains at least one processing unit coupled to a device control unit via a switching unit, said processing unit and said switching unit and said switching unit and said control unit being interconnected by respective links.

11. In a system for bidirectional communication among digital units, comprising:

a plurality of processing units and at least one control unit and at least one intermediate unit for coupling the other units via fiber optic links between each of the units, each of said units having a fiber optic link adapter interface which may be actuated to form either a static or dynamic connection between the link adapter interfaces at the ends of each link units for establishing bidirectional communication between the units over the links, and wherein a processor or a control unit can function either as an originating unit or a destination unit in bidirectional communication between units, and in which an originating unit transmits data to a destination unit via an intermediate unit, said originating unit being coupled to said intermediate unit via a first link, said intermediate unit being coupled to said destination unit via a second link, said intermediate unit propagating at least some errors originating on said first link to said second link, with either said first link or said second link possibly having a fault and where faults generate error fault signals which may originate from several link adapters of the system from the plural links of the system simultaneously, and where errors occurring on a source link rating below a threshold are propagated to the destination link such that from the standpoint of the destination unit they are indistinguishable from errors arising on the destination link, and wherein said system has a fault analyzer for receiving a fault signal originating form said link adapters for isolating a link on which a fault originates, said fault analyzer providing a correct attribution of errors to a failing link when errors may occur either on a source link or a destination link without mistaking detected threshold crossings caused by cumulative errors occurring over a link, said system including for isolating errors originating on said links:

(a) means for detecting the occurrence of errors on said first link in excess of a first threshold;

(b) means for detecting the occurrence of errors on said second link in excess of a second threshold greater than said first threshold; and (c) means responsive to said detecting means for attributing said errors to said links after the detection of said errors in excess of said thresholds, by (1) attributing errors to said first link when errors have been detected in both of said links in excess of the thresholds on both of said links, and (b 2) attributing errors to the link having an error detected when errors have been detected in only one of said links in excess of the threshold for the link.

12. Apparatus as in claim 11 in which each of said detecting means forms part of said link adapter interface which includes means counting the number of errors occurring within a predetermined period.

13. Apparatus as in claim 12 in which each of said detecting means includes means for counting the number of intervals of predetermined duration shorter than the corresponding period within which one or more errors occur.

14. Apparatus as in claim 11 in which each of said links has a source end nearer to said source unit and a destination end nearer to said destination unit, said detecting means being located at the destination ends of said links.

15. Apparatus as in claim 11 in which said system contains at least one processing unit coupled to a device control unit via a switching unit, said processing unit and said switching unit and said switching unit and said control unit being interconnected by respective links.

16. In a system having a plurality of processing units and at least one control unit and at least one intermediate unit coupling the other units via an interconnection switch of the intermediate unit and fiber optic links between each of the units, and wherein each of said units has a fiber optic link adapter interface for coupling the unit to a link, and wherein said intermediate unit includes an interconnection switch which may be actuated to from either a static or dynamic connection between the link adapter interfaces at the ends of each link units for establishing bidirectional communication between the units over the links, and in which an originating unit transmits data a destination unit via an intermediate unit, said originating unit being coupled to said intermediate unit via a first link, said intermediate unit being coupled to said destination unit via a second link, said intermediate unit propagating at least some errors originating on said first link to said second link, a method of isolating errors originating on said links including the steps of:

(a) detecting the occurrence of errors on said first link in excess of a first threshold;

(b) detecting the occurrence of errors on said second link in excess of a second threshold;

(c) attributing said errors to said first link in response to the detecting of errors in excess of the thresholds on both of said links; and (d) attributing said errors to the link for which the threshold was exceeded in response to the detecting of errors in excess of the threshold on only one of said links.

17. A method as in claim 16 in which said transmitted data consists of a stream of characters from which certain characters are disallowed, each of said detecting steps including the step of detecting the occurrence of a disallowed character on the corresponding link.

18. A method as in claim 16 in which said transmitted data consists of a stream of characters having respective disparities associated therewith, each of said detecting steps including the step of determining the cumulative disparity of the characters transmitted on the corresponding link.

19. A method as in claim 16 in which each of said detecting steps includes the step of counting the number of errors occurring within a predetermined period.

20. A method as in claim 19 in which each of said detecting steps includes the step of counting the number of intervals of predetermined duration shorter than the corresponding period within which one or more errors occur.

* * * * *